(12) United States Patent
Sien

(10) Patent No.: US 7,125,064 B1
(45) Date of Patent: Oct. 24, 2006

(54) VEHICLE WINDOW COVERING SYSTEM

(76) Inventor: Susan M. Sien, 5000 Mission Oak Blvd. # 39, Austin, TX (US) 78735

( * ) Notice: Subject to any disclaimer, the term of this patent is extended or adjusted under 35 U.S.C. 154(b) by 0 days.

(21) Appl. No.: 11/193,768

(22) Filed: Aug. 1, 2005

(51) Int. Cl.
*B60N 3/12* (2006.01)

(52) U.S. Cl. .................. 296/37.8; 160/370.22

(58) Field of Classification Search ............. 296/97.8, 296/37.8; 160/370.22, 23
See application file for complete search history.

(56) References Cited

U.S. PATENT DOCUMENTS

| | | |
|---|---|---|
| 4,736,980 A | 4/1988 | Eubanks |
| 4,921,299 A | 5/1990 | Herrick |
| RE33,804 E | 1/1992 | Phillips |
| 5,344,206 A | 9/1994 | Middleton |
| 5,615,924 A | 4/1997 | Owen |
| 5,782,284 A * | 7/1998 | Leatherman ........... 160/370.22 |
| 5,860,466 A * | 1/1999 | Kao ....................... 160/370.22 |
| D410,360 S | 6/1999 | Aranzazu |

* cited by examiner

*Primary Examiner*—Joseph D. Pape

(57) ABSTRACT

A vehicle window covering system includes a front window of a vehicle that has a first lateral edge and a second lateral edge. A housing is mounted within the vehicle and positioned adjacent to the first lateral edge. The housing has a vertical slot extending therein. A spindle is rotatably mounted in the housing and is generally aligned with the slot. A flexible panel is attached to and wound around the spindle. The panel is opaque and a free end of the panel extends outwardly of the housing through the slot. A coupler releasably secures the free end the vehicle adjacent to the second lateral edge so that the front window is covered.

5 Claims, 9 Drawing Sheets

VEHICLE WINDOW COVERING SYSTEM

BACKGROUND OF THE INVENTION

1. Field of the Invention

The present invention relates to window covering devices and more particularly pertains to a new window covering device for allowing selective covering of a vehicle window from within the vehicle.

2. Description of the Prior Art

The use of window covering devices is known in the prior art. U.S. Pat. No. 5,615,824 describes a covering device that is positionable against an exterior surface of a vehicle window. Another type of window covering device that is attachable directly to a window is found in U.S. Pat. No. 4,736,980. An interior heat shield, which includes panels that are extendable toward each other to cover a window, is shown in U.S. Pat. No. 4,921,299.

While these devices fulfill their respective, particular objectives and requirements, the need remains for a device that is mountable within a vehicle and can be used for selectively covering a windshield of the vehicle to prevent heat buildup within the vehicle. Additionally, the device may be incorporated directly into the structure of the vehicle for more convenient use.

SUMMARY OF THE INVENTION

The present invention meets the needs presented above by generally comprising a front window of a vehicle that has a first lateral edge and a second lateral edge. A housing is mounted within the vehicle and positioned adjacent to the first lateral edge. The housing has a vertical slot extending therein. A spindle is rotatably mounted in the housing and is generally aligned with the slot. A flexible panel is attached to and wound around the spindle. The panel is opaque and a free end of the panel extends outwardly of the housing through the slot. A coupler releasably secures the free end the vehicle adjacent to the second lateral edge so that the front window is covered.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
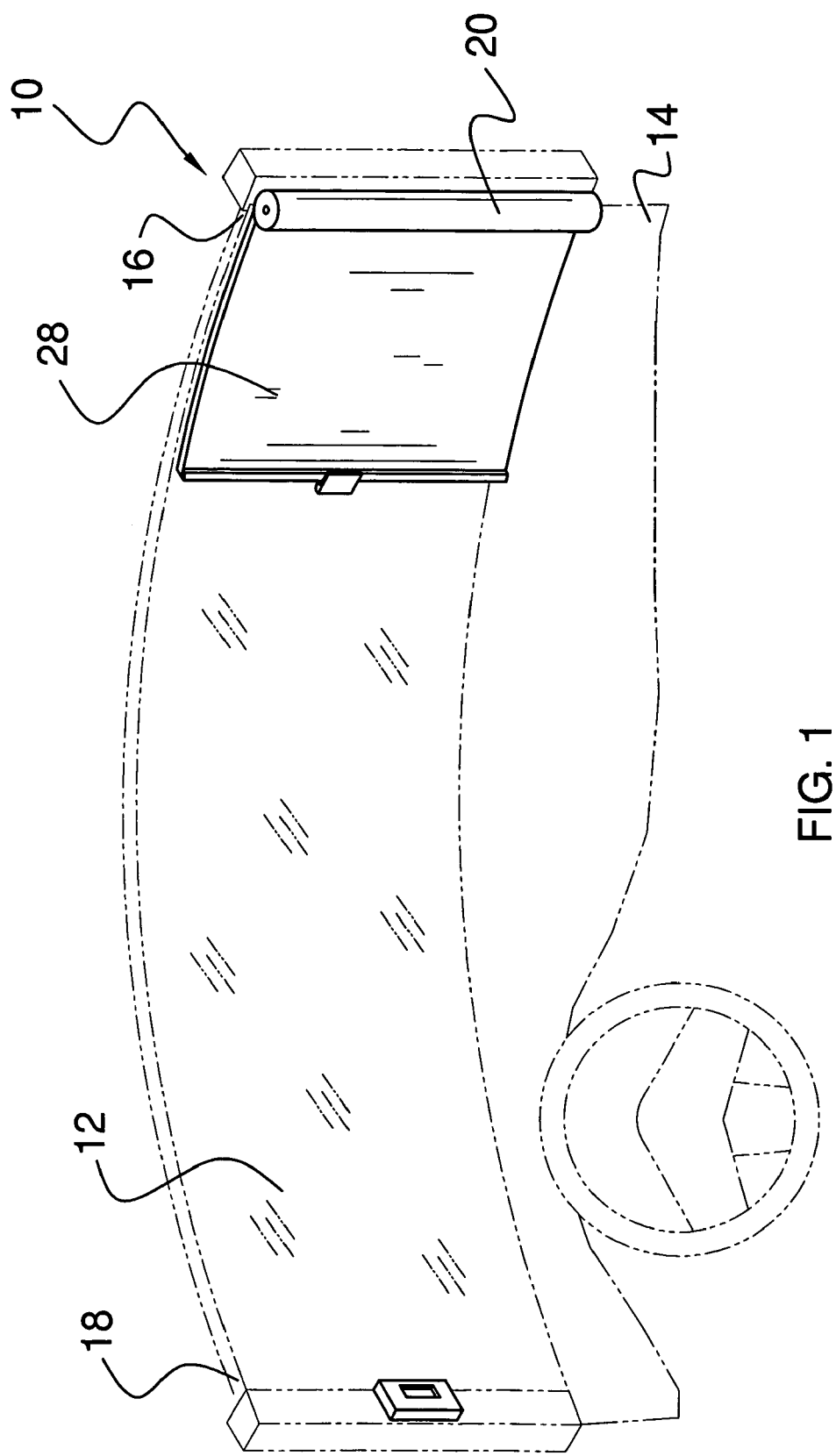
FIG. 1 is a front perspective view of a first embodiment of a vehicle window covering system according to the present invention.
Figure 2:
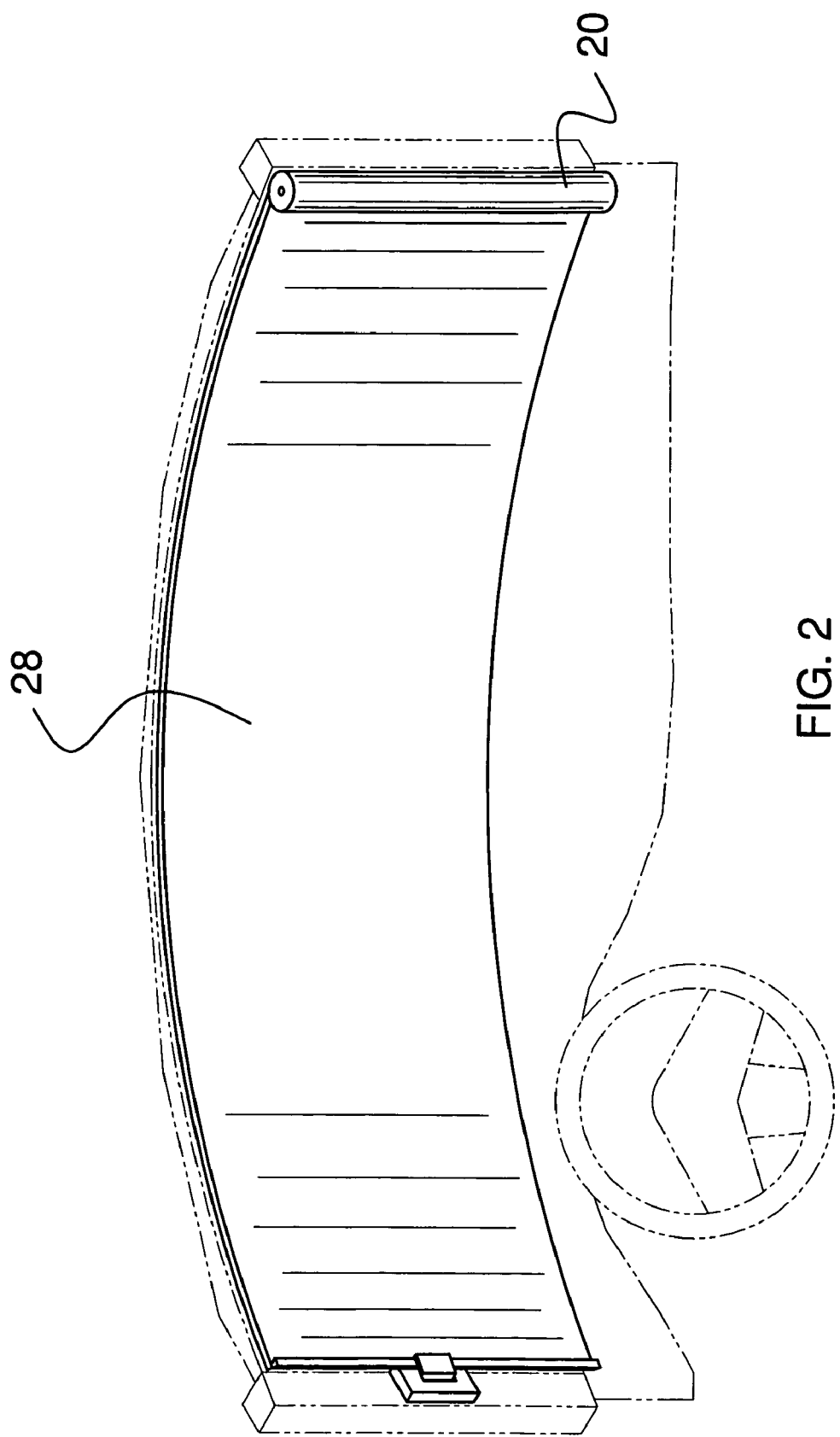
FIG. 2 is a front perspective view of the present invention.
Figure 3:
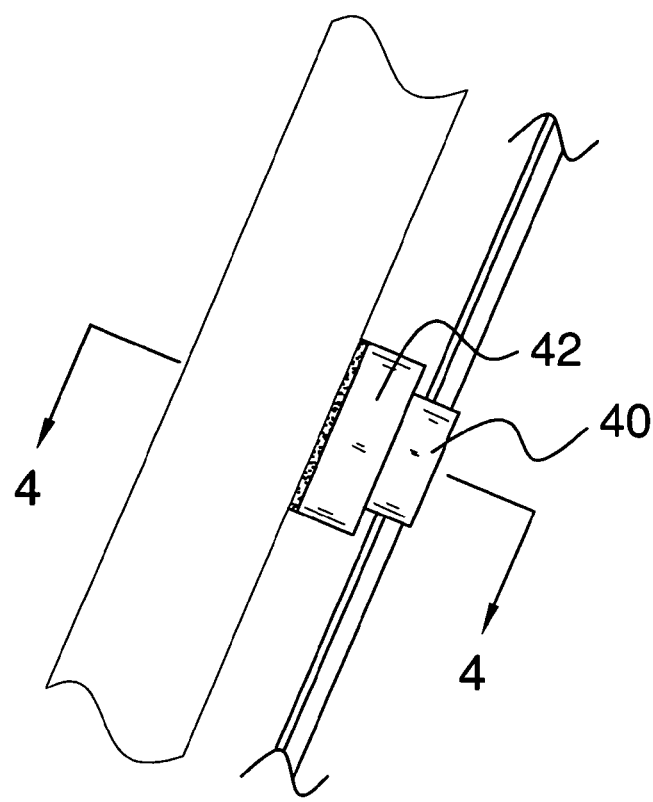
FIG. 3 is a side view of a coupler of the present invention.
Figure 4:
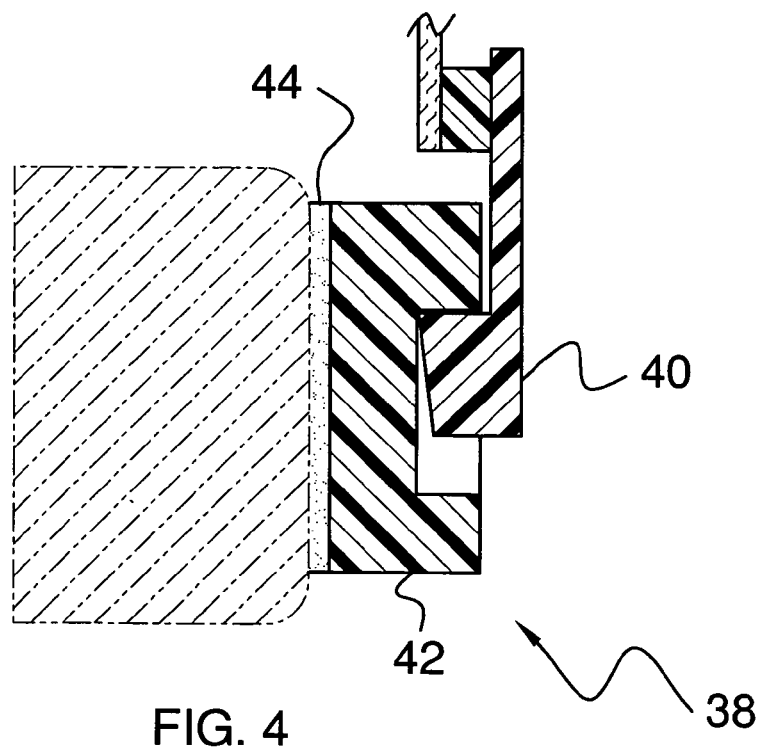
FIG. 4 is a cross-sectional view taken along line 4—4 of FIG. 3 of the present invention.

With reference now to the drawings, and in particular to FIGS. 1 through 10 thereof, a new window covering device embodying the principles and concepts of the present invention and generally designated by the reference numeral 10 will be described.

As best illustrated in FIGS. 1 through 10, the vehicle window covering system 10 generally comprises a conventional front window 12 of a vehicle 14. The front window 12 has a first lateral edge 16 and a second lateral edge 18.

A housing 20 is mounted within the vehicle and is positioned adjacent to the first lateral edge 16. The housing 20 may be mounted on a surface of an interior of the vehicle 14 as shown in the first embodiment of FIG. 1 or within a portion of the vehicle 14 itself as shown in the third embodiment of FIG. 7. The housing 20 has a vertical slot 22 extending therein. A spindle 24 is rotatably mounted in the housing 20 and is generally aligned with the slot 22. A rotation of the spindle 24 is biased in a first direction by a spring 26 wound around and attached to the spindle 24.

A flexible panel 28 is attached to and is wound around the spindle 24 when the spindle 24 is rotated in the first direction. The panel 28 is opaque and a free end 30 of the panel 28 extends outwardly of the housing 20 through the slot 22. A rigid elongated member 36 is attached to and extends along the free end 30. The panel 28 has an upper edge 32 and a lower edge 34. A height from the upper edge 32 to the lower edge 34 is generally between 16 inches and 36 inches.

A coupler 38 is configured to releasably secure the free end 30 to the vehicle adjacent to the second lateral edge 18. The coupler 38 includes a first mating member 40 attached to the free end 30 and a second mating member 42 attached to the vehicle 14. The first mating member 40 comprises a male coupler and the second mating member 42 comprises a female coupler. The male coupler, or first mating member 40, has a width greater than the slot 22 to ensure that the free end 30 is easily removable from the housing 20. In the first embodiment, the housing 20 and coupler 38 may be attached to the vehicle 14 with an adhesive 44.

Figure 5:
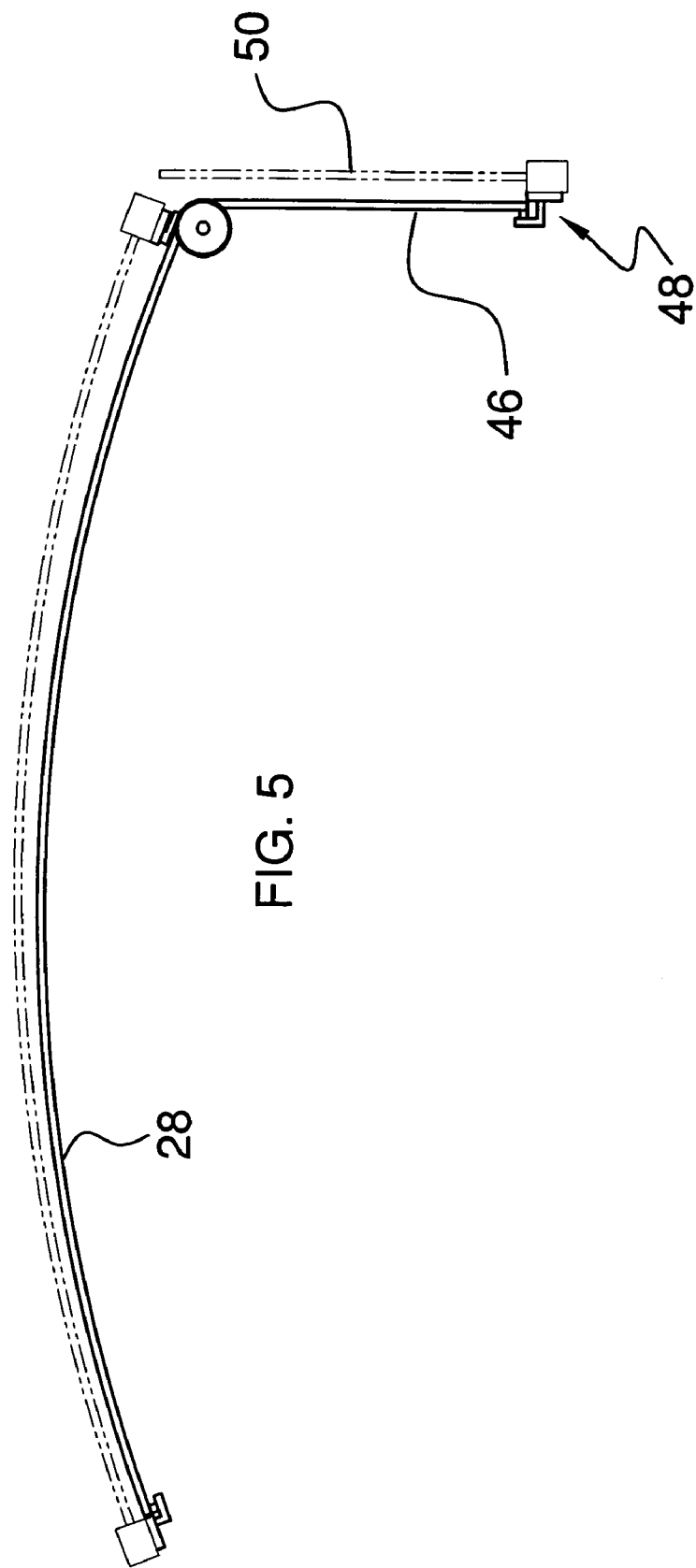
FIG. 5 is a top view of a second embodiment of the present invention.
Figure 6:
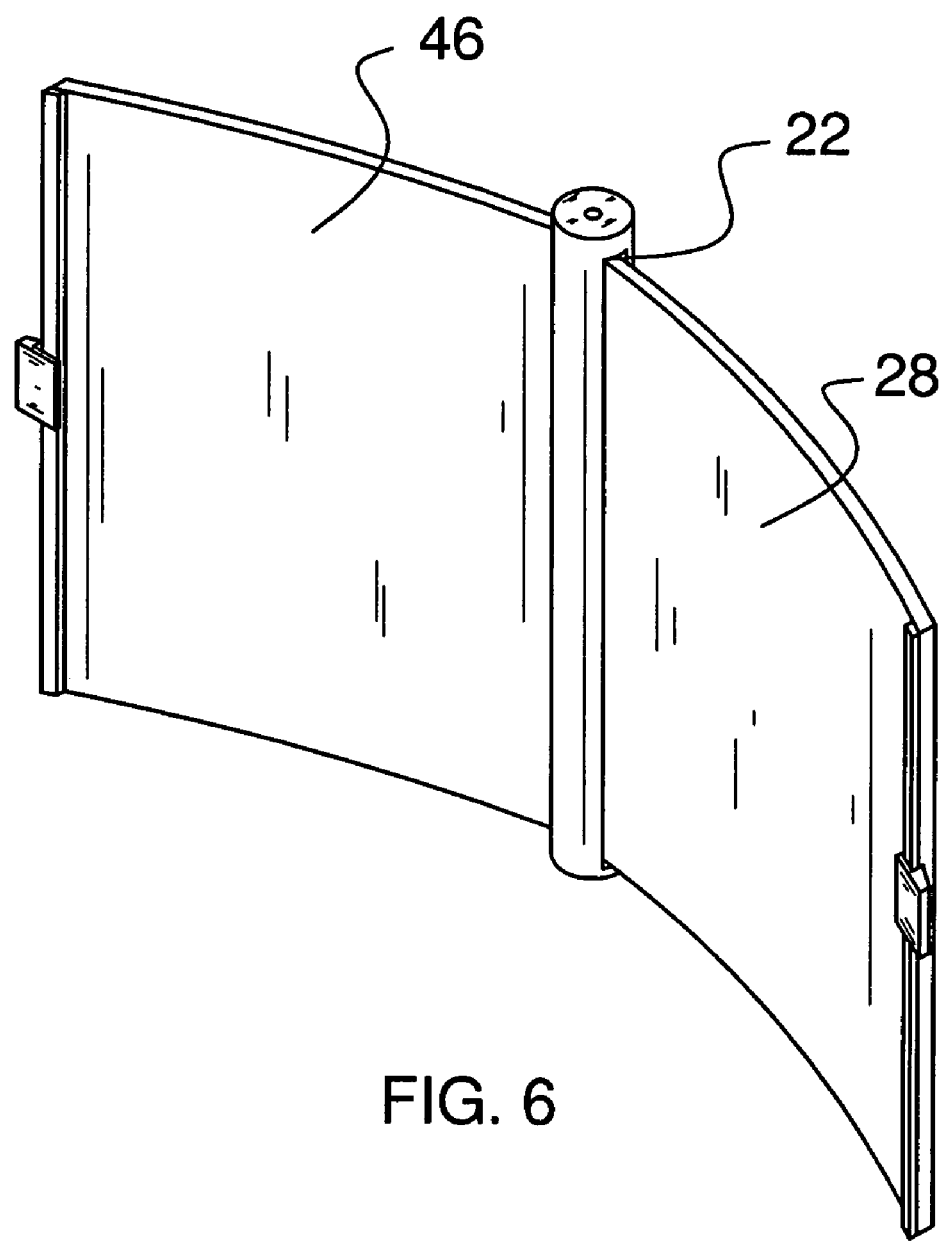
FIG. 6 is a bottom perspective view of the second embodiment of the present invention.
Figure 7:
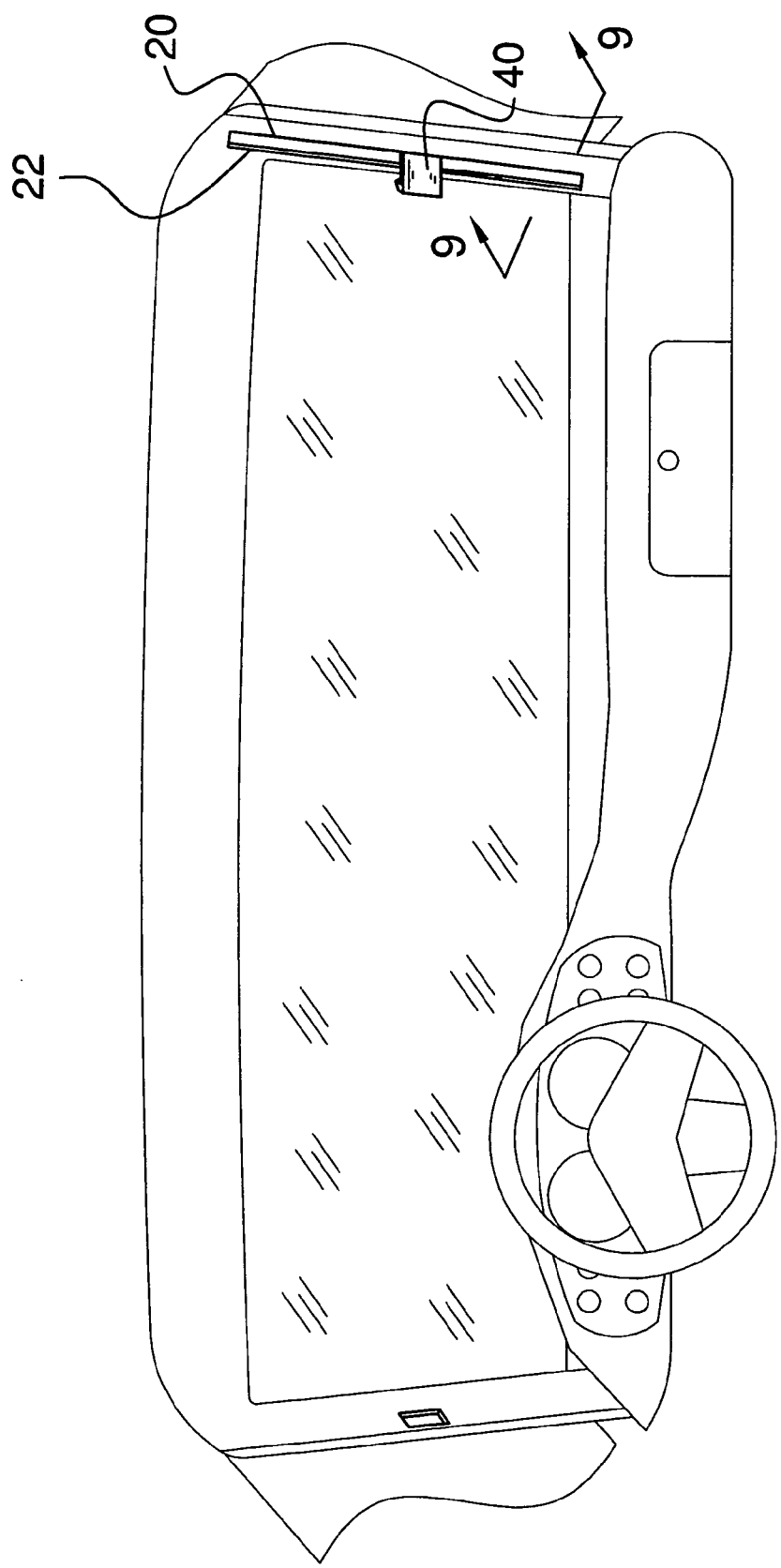
FIG. 7 is a front perspective view of a third embodiment of the present invention.
Figure 8:
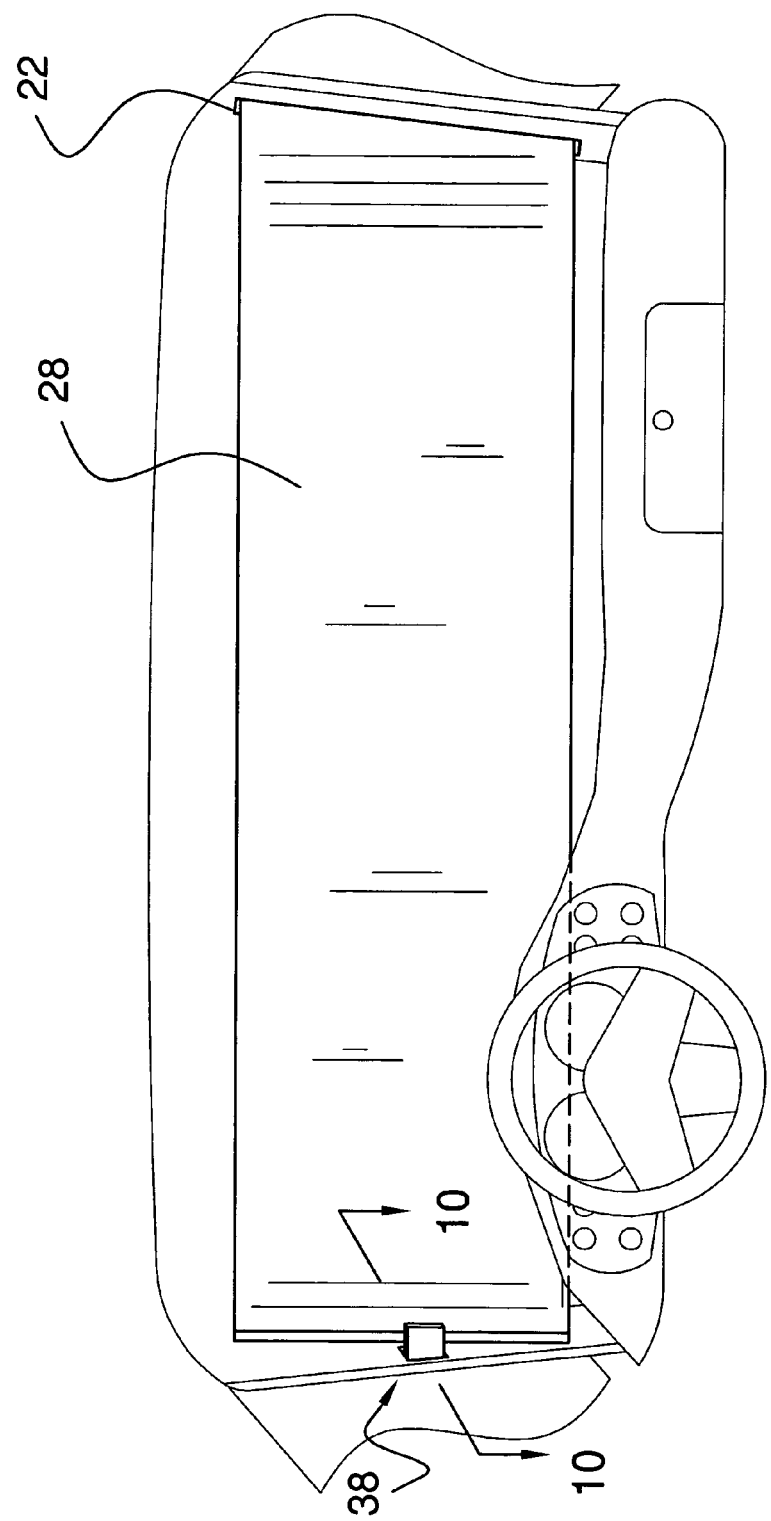
FIG. 8 is a front perspective view of the third embodiment of the present invention.
Figure 9:
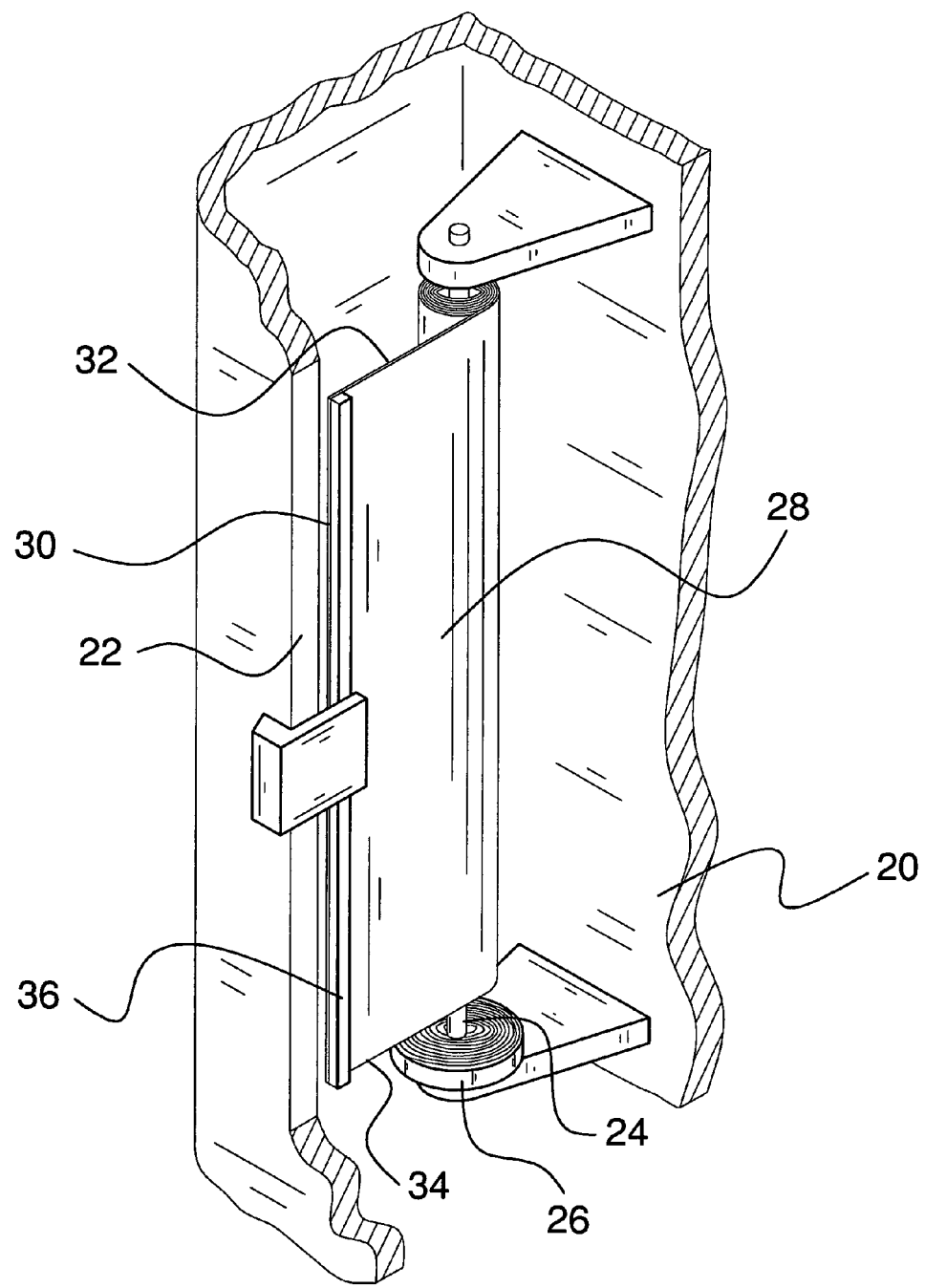
FIG. 9 is a cross-sectional view taken along line 9—9 of FIG. 7 of the present invention.
Figure 10:
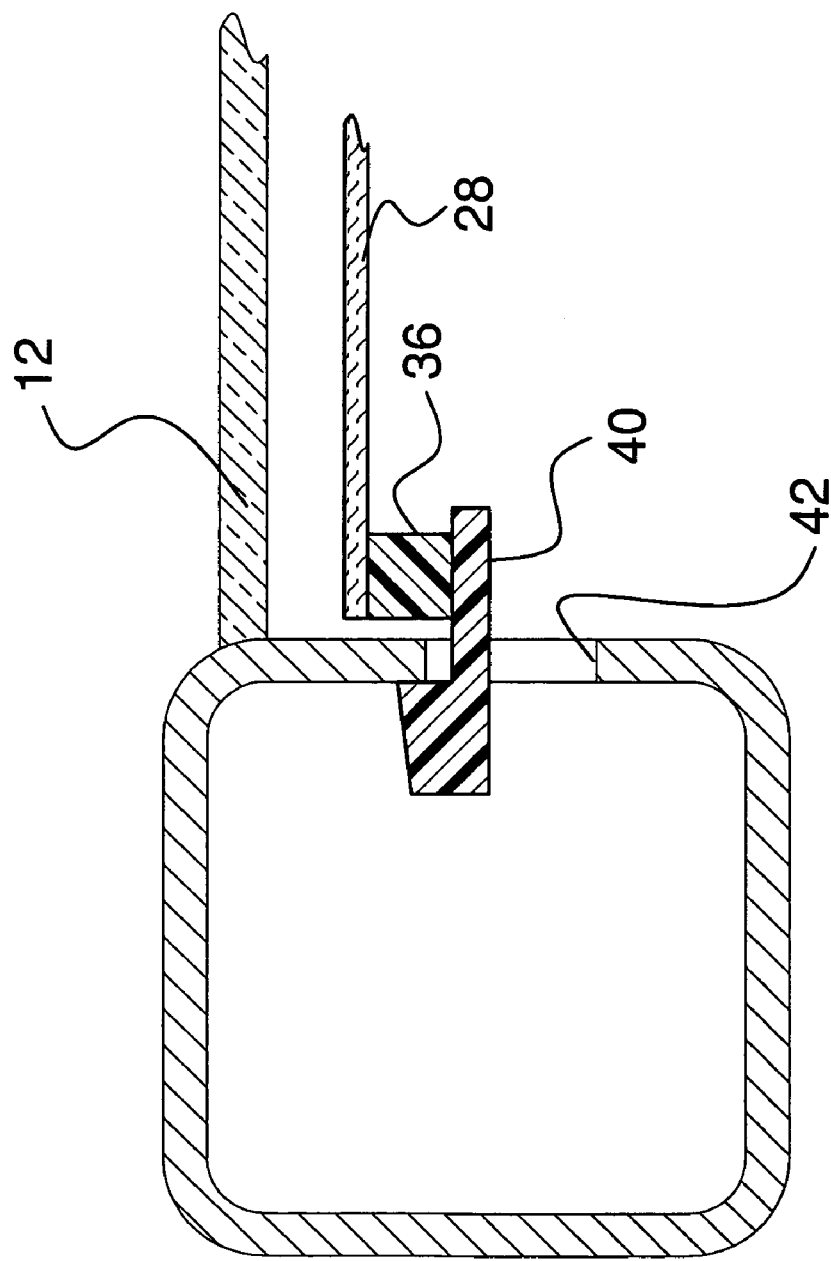
FIG. 10 is a cross-sectional view taken along line 10—10 of FIG. 8 of the present invention.

A second embodiment is found in FIGS. 5 and 6 and includes a second panel 46 removably extendable out of the housing 20. The second panel 46 may be attached to the same spindle 24 or to a second spindle mounted within the housing 20. A second coupler 48 allows the second panel 46 to be extended over a side window 50 of a vehicle 14.

In use, a person releasably couples the free end 30 adjacent to the second lateral edge 18 with the coupler 38. This is done to cover the front window 14 and may also be done to cover the side window 50 if the second embodiment is used. This prevents excessive light from entering the vehicle 14 and reduces heat buildup within the vehicle 14.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of covering a vehicle windshield, said method comprising the steps of:

providing a front window of a vehicle, said front window having a first lateral edge and a second lateral edge;

providing a housing mounted within said vehicle and positioned adjacent to said first lateral edge, said housing having a vertical first slot and a vertical second slot extending therein, a spindle being rotatably mounted in said housing, said spindle being generally aligned with said first slot;

providing a flexible first panel being attached to and wound around said spindle, said first panel being opaque, a free end of said first panel extending outwardly of said housing through said first slot;

providing a first coupler configured to releasably secure said free end of said first panel to the vehicle adjacent to said second lateral edge;

releasably coupling said free end of said first panel adjacent to said second lateral edge with said first coupler and covering said front window;

providing a second panel being attached to and wound around said spindle, said second panel being opaque, a free end of said second panel extending outwardly of said housing through said second slot;

providing a second coupler attached to said free end of said second panel; and extending said second panel over a side window of the vehicle and releasably coupling said free end of said second panel to said vehicle when said second panel is extended over the side window.

2. The method according to claim 1, wherein rotation of said spindle is biased in a first direction.

3. The method according to claim 1, further providing a rigid elongated member being attached to and extending along said free end of said first panel.

4. The method according to claim 1, wherein said first panel has an upper edge and a lower edge, a height from said upper edge to said lower edge being generally between 16 inches and 36 inches.

5. The method according to claim 1, wherein said first coupler includes a first mating member attached to said free end of said first panel and a second mating member attached to said vehicle, said first mating member being a male mating member and said second mating member being a female mating member.

* * * * *